United States Patent [19]

Scott

[11] 3,804,533
[45] Apr. 16, 1974

[54] ROTOR FOR FLUOROMETRIC MEASUREMENTS IN FAST ANALYZER OF ROTARY

[75] Inventor: Charles D. Scott, Oak Ridge, Tenn.

[73] Assignee: The United States of America as represented by the United States Atomic Energy Commission, Washington, D.C.

[22] Filed: Nov. 29, 1972

[21] Appl. No.: 310,614

[52] U.S. Cl. .............................. 356/197, 356/246
[51] Int. Cl. ............................................ G01n 1/10
[58] Field of Search ............ 356/197, 246; 250/218

[56] References Cited
UNITED STATES PATENTS

| | | | |
|---|---|---|---|
| 3,547,547 | 12/1970 | Anderson | 356/197 |
| 3,555,284 | 1/1971 | Anderson | 250/218 |
| 3,576,441 | 4/1971 | Adams et al. | 250/218 |
| 3,669,551 | 6/1972 | Bucher et al. | 356/197 |

Primary Examiner—William L. Sikes
Attorney, Agent, or Firm—John A. Horan; David S. Zachry; Stephen Hamel

[57] ABSTRACT

An improved rotor is provided for simultaneously making fluorometric measurements on a multiplicity of discrete samples. A multiplicity of sample analysis chambers or cuvettes are arranged side by side in a circular array to form a rotary cuvette system within the rotor. Each chamber comprises an inclined, open-ended cavity adapted to retain liquids within its radial extremity upon rotation. Surface fluorescence measurements are made while sample liquids are so retained by means of a fluorescence excitation light source and photodetector adapted, respectively, to direct a light beam and detect fluorescence emitted through the open end of the sample analysis chamber. Sample and reagent loading cavities, adapted to be loaded under static conditions, discharge upon rotation through liquid mixing and transfer passageways into respective sample analysis chambers.

6 Claims, 5 Drawing Figures

ROTOR FOR FLUOROMETRIC MEASUREMENTS IN FAST ANALYZER OF ROTARY

BACKGROUND OF THE INVENTION

The invention relates generally to solute concentration measuring instruments and more particularly to an improved rotor for making fluorometric measurements in a fast analyzer of the rotary cuvette type. It was made in the course of, or under, a contract with the U. S. Atomic Energy Commission.

Fast analyzers of the rotary cuvette type have been developed for making simultaneous photometric measurements of a multiplicity of discrete samples. Such analyzers are described in detail in U. S. Pat. Nos. 3,547,547; 3,555,284; and 3,586,484, issued to common assignee. The cuvette rotors described in those patents are designed expressly for photometric measurements with a stationary light source positioned above the rotor and a stationary photodetector, in axial alignment with the light source, disposed below. That arrangement is not suitable for making fluorometric measurements, however, because of difficulties in differentiating fluorometric emissions from interfering excitation light which passes through the sample. Another problem designated the "inner filter effect" occurs where the sample is characterized by relatively high absorbancy. That portion of the sample between the cuvette window and a sample incremental volume element attenuates the excitation beam and thus reduces the fluorescence emitted. The emitted radiation is attenuated in much the same manner although to a lesser degree than that associated with the exciting beam.

It is, accordingly, a general object of the invention to provide a rotor design suitable for making fluorometric measurements in a fast analyzer of the rotary cuvette type.

Other objects of the invention will be apparent from an examination of the following description of the invention and the appended drawings.

SUMMARY OF THE INVENTION

In accordance with the invention, an improved rotor is provided for simultaneously making fluorometric measurements on a multiplicity of discrete samples. A multiplicity of sample analysis chambers or cuvettes are arranged side by side in a circular array to form a rotary cuvette system within the rotor. Each chamber or cuvette comprises an inclined, open-ended cavity adapted to retain liquids within its radial extremity upon rotation. Surface fluorescence measurements are made while sample liquids are so retained by means of a fluorescence excitation light source and photodetector adapted, respectively, to direct a light beam and detect fluorescence emitted through the open end of the sample analysis chamber. Sample and reagent loading cavities, adapted to be loaded and to retain liquid under static conditions, discharge upon rotation through liquid mixing and transfer passageways into respective sample analysis chambers. Rotors made in accordance with the invention are of simple construction and are amenable to use in existing fast analyzers of the rotary cuvette type with only minor analyzer modifications being required.

DESCRIPTION OF THE PREFERRED EMBODIMENT

Figure 2:
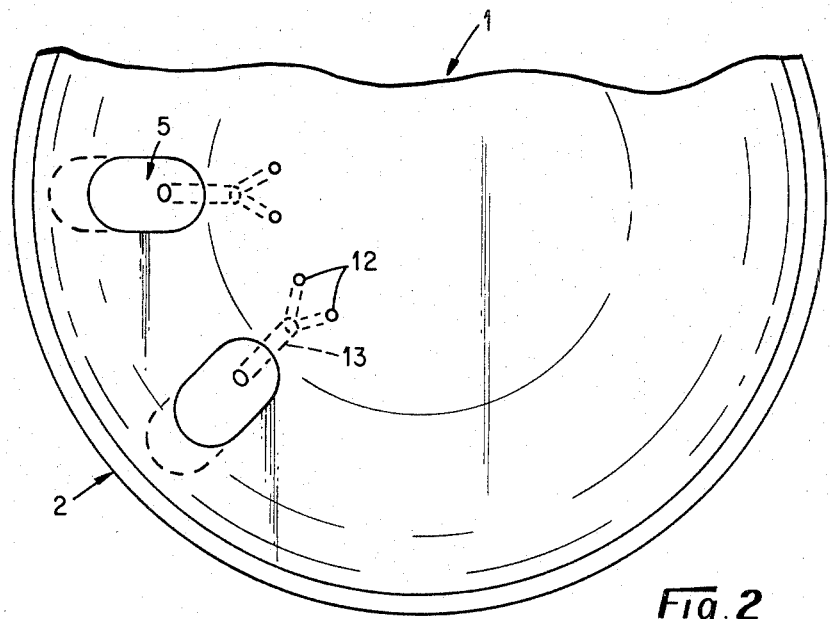
FIG. 2 is a plan view of the rotor of FIG. 1.
Figure 1:
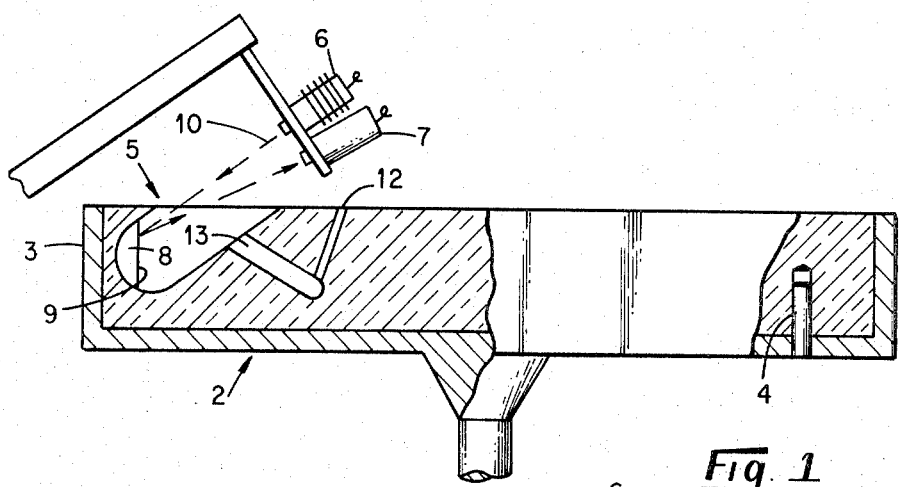
FIG. 1 is a vertical section view of a rotor made in accordance with the invention and including a light source, photodetector, and rotor holder.

Referring now to the drawings, initially to FIGS. 1 and 2, an improved rotor 1 for making fluorometric measurements in a fast analyzer of the rotary cuvette type is shown in vertical section and plan view, respectively. Rotor 1, which may be fabricated from polytetrafluorethylene or acrylic plastic, is positioned within a turntable 2 having an upstanding rim 3 and retaining pin 4 for restraining the rotor during rotation. A multiplicity of sample analysis chambers or cuvettes 5 are disposed in a circular array within rotor 1 at an equal distance from the center of that rotor. Rotation of turntable 2 causes the cuvettes to pass sequentially past a suitably inclined stationary light source 6 and photodetector 7 whose operation will be explained below.

Figure 3:
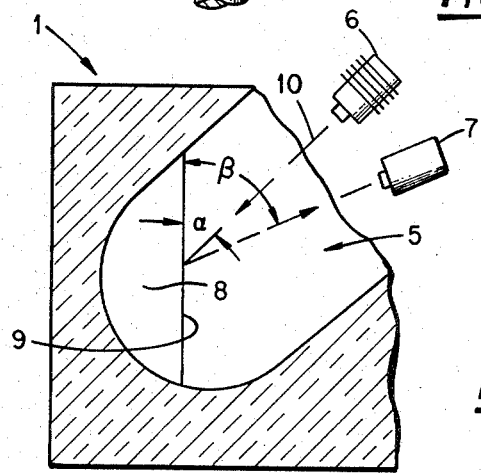
FIG. 3 is an enlarged sectional view of a sample analysis cavity illustrating the angular relationships between the sample being analyzed, excitation light source, and fluorescence detector.

As shown in FIG. 1, each cuvette 5 comprises an inclined, open-ended, generally cylindrical cavity adapted to retain a liquid sample 8 within its hemispherical shaped radial extremity during rotation. The free surface 9 of sample 8 assumes a vertical inclination during rotation due to the large, radially inward acceleration forces developed as a result of the rotation. FIG. 3, which shows a typical cuvette 5 containing a sample 8, illustrates the preferred orientation of light source 6 and photodetector 7 to minimize the detection of reflected light by the photodetector. Light source 6 should be positioned to direct an excitation light beam 10 at an inclination $\alpha$ of less than 90° from the vertical. Photodetector 7 should be inclined to detect fluorescence emitted at an angle $\beta$ which is less than 90° + $\alpha$ and preferably as close as possible to $\alpha$. Angles $\alpha$ and $\beta$ of 45° and 60° have been successfully used by the inventor although a wide variety of other angles may be used without departing from the scope of the invention. It will be apparent that, for successful operation, the cuvette design must permit the passage of the excitation light beam and the emitted fluorescence through the open end of the cuvette or, stated another way, sample 8 must be visible through the open end of the cuvette. For best results, the total volume of sample 8 should be kept small and within narrow limits by precise loading of sample and reactant volumes.

Each cuvette 5 has associated therewith a pair of sample and reagent loading cavities 12 and a liquid mixing and transfer passageway 13 communicating between the cuvette and the loading cavities. Cavities 12 are sized to retain aqueous based samples and reagents under static conditions due to surface tension forces. Upon rotation, sample and reagent liquids discharge from cavities 12 into passageway 13 and thence into cuvette 5. As shown, cavities 12 are inclined downwardly and radially outward from the top of rotor 1 to passageway 13 which extends radially outward to cuvette 5. A slight radial inclination of cavities 12 is necessary to permit acceleration-induced flow of sample and reagent liquids from cavities 12 to cuvette 5 upon rotation of rotor 1.

Figure 5:
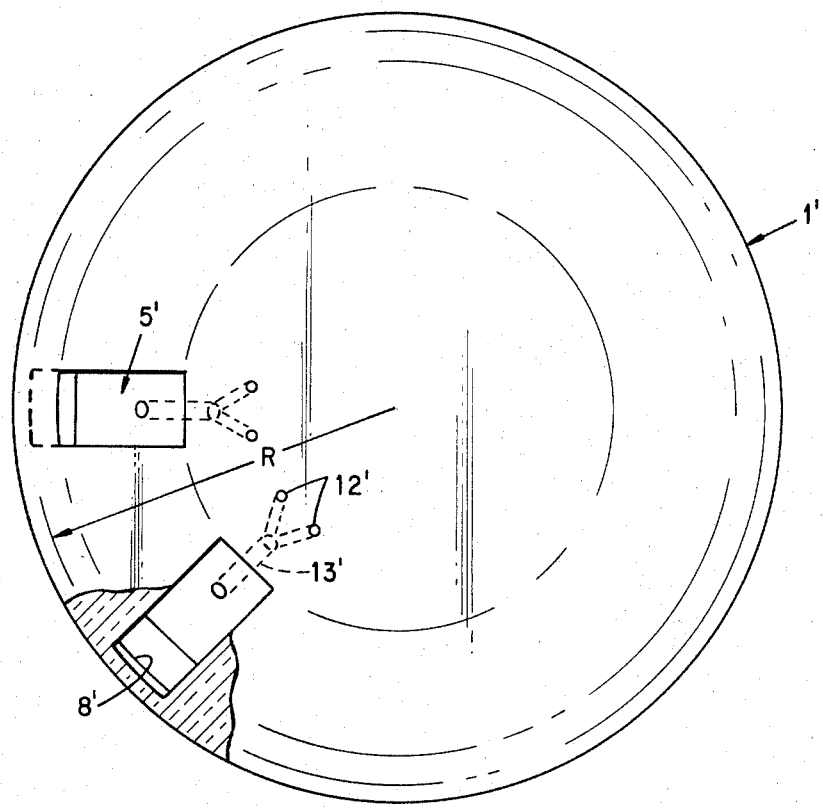
FIG. 5 is a plan view, partially sectioned, of the rotor embodiment of FIG. 4.
Figure 4:
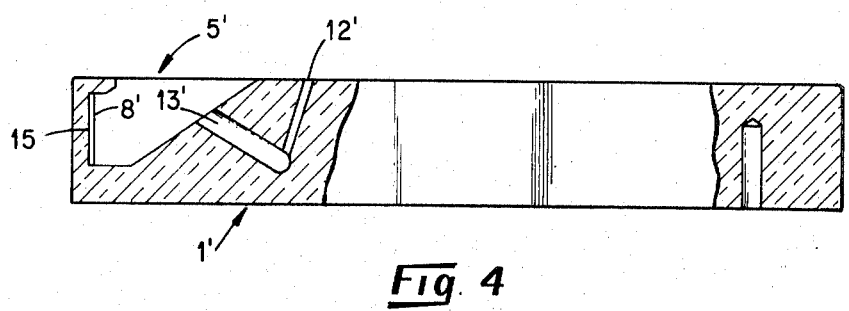
FIG. 4 is a vertical section view of an alternative rotor embodiment made in accordance with the invention.

FIGS. 4 and 5 illustrate an alternative rotor embodiment wherein cuvettes 5' have a configuration which promotes a uniform thickness or depth in sample 8' during rotation. As shown, the radial extremity 15 of each cuvette 5' is vertical in the vertical section view of FIG. 4 and a circular segment of radius R in horizontal section as shown in FIG. 5. The radial extremity or end surface of each cuvette 5' thus comprises a vertically oriented cylindrical surface having a radius equal to the displacement of that surface from the center of rotation of rotor 1'. Loading cavities 12' and mixing and transfer passageway 13' are also provided in the alternative embodiment where they operate in the same manner as the corresponding cavities 12 and passageway 13 described above in reference to FIGS. 1, 2, and 3.

The foregoing description of two embodiments of the invention is offered for illustrative purposes only and should not be interpreted in a limiting sense. For example, cuvette rotors containing more or less than eight cuvettes may be provided without departing from the scope of the invention. In addition, other sample and reagent loading arrangements may be used. One such arrangement is shown in the transfer disk described in U. S. Pat. No. 3,555,284, issued Jan. 12, 1971, to common assignee. According to that patent, sample and reagent liquids are loaded into open, sloping, cylindrical cavities 14 interconnected at their open ends and separated by partitions 15 at their lower ends. Partitions 15 prevent mixing of the sample and reactant liquids while the rotor is at rest while permitting those liquids to pass to cuvettes 9 when the rotor is spinning. Another loading arrangement, which is especially suitable where it is desired to perform a multiplicity of tests on a single sample, is described in U. S. Pat. No. 3,547,547, issued Dec. 15, 1970, to common assignee. The arrangement of that patent permits the introduction of sample liquid into a spinning rotor. A central distribution chamber 25 is provided with a serrated periphery 26 to cause liquid fed therein to be substantially equally distributed to a multiplicity of cavities surrounding the chamber. Such a chamber could be used to distribute sample material to the sample analysis chambers or cuvettes 5 of the present invention in a like manner. The reagents could be preloaded into the cuvettes and lyophilized well in advance of a testing operation. Prior to sample injection, the lyophilized reagents would be solubilized by injecting water or buffer into the spinning rotor in the same manner as described above. In view of the foregoing alternatives, it is intended that the invention be limited only by the scope of the claims appended hereto.

What is claimed is:

1. An improved rotor for simultaneously making surface fluorescence measurements of a multiplicity of samples comprising a generally disk-shaped member having a top surface, said disk-shaped member defining:
   a. a circular array of sample analysis cuvettes for respectively receiving liquid samples and reagents; said cuvettes each comprising an elongated, radially extending cavity having an open end in said top surface and a closed end disposed radially outward from said open end for retaining preselected amounts of liquid samples and reagents during rotation, said closed end and sample and reagent liquid retained therein being visible through said open end during rotation; and
   b. means for loading sample and reagent liquids into said sample analysis cuvettes.

2. The improved rotor of claim 1 wherein said radially extending cavity comprises a generally cylindrical cavity terminating in a hemispherical closed-end portion, said cylindrical cavity being inclined with respect to said top surface.

3. The improved rotor of claim 1 wherein said closed end of said radially extending cavity terminates in a cylindrical surface having a radius equal to the displacement of said surface from the center of rotation of said rotor.

4. The improved rotor of claim 1 wherein said means for loading sample and reagent liquids into said sample analysis cuvettes comprises a circular array of sample and reagent loading cavities having open ends in said top surface and being disposed radially inward from said array of sample analysis cuvettes; one pair of said sample and reagent loading cavities being provided for each of said cuvettes; and passageways communicating between each of said pairs of sample and reagent loading cavities and respective cuvettes in said array of sample analysis cuvettes to effect transfer of liquids from said sample and reagent loading cavities to said cuvettes upon rotation.

5. The improved rotor of claim 4 wherein said sample and reagent loading cavities are generally cylindrical in shape and are inclined downwardly from said top surface and radially outward.

6. The improved rotor of claim 5 wherein said passageways communicating between each of said pairs of sample and reagent loading cavities and respective cuvettes intersect said cavities at their lower, radially outer ends.

* * * * *